United States Patent
Myers et al.

(10) Patent No.: US 12,101,342 B2
(45) Date of Patent: *Sep. 24, 2024

(54) SYSTEM AND METHOD FOR MONITORING NETWORK ACTIVITY FOR DETECTING DATA EXFILTRATION EVENTS

(71) Applicant: Rapid7, Inc., Boston, MA (US)

(72) Inventors: Dustin Myers, Alexandria, VA (US); Vasudha Shivamoggi, Cambridge, MA (US); Roy Hodgman, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 405 days.

This patent is subject to a terminal disclaimer.

(21) Appl. No.: 17/336,593

(22) Filed: Jun. 2, 2021

(65) Prior Publication Data
US 2021/0288986 A1    Sep. 16, 2021

Related U.S. Application Data

(63) Continuation of application No. 16/287,415, filed on Feb. 27, 2019, now Pat. No. 11,057,410.

(51) Int. Cl.
| | |
|---|---|
| *H04L 9/40* | (2022.01) |
| *H04L 41/142* | (2022.01) |
| *H04L 43/04* | (2022.01) |
| *H04L 43/062* | (2022.01) |
| *H04L 43/065* | (2022.01) |
| *H04L 43/067* | (2022.01) |
| *H04L 43/16* | (2022.01) |

(52) U.S. Cl.
CPC ........ *H04L 63/1425* (2013.01); *H04L 41/142* (2013.01); *H04L 43/04* (2013.01); *H04L 43/062* (2013.01); *H04L 43/065* (2013.01); *H04L 43/067* (2013.01); *H04L 43/16* (2013.01); *H04L 63/1441* (2013.01)

(58) Field of Classification Search
CPC ... H04L 63/1425; H04L 41/142; H04L 43/04; H04L 43/062; H04L 43/065; H04L 43/067; H04L 43/16; H04L 63/1441
USPC .......................................................... 726/23
See application file for complete search history.

(56) References Cited

U.S. PATENT DOCUMENTS 9,516,053 B1    12/2016  Muddu et al.
10,091,222 B1 *  10/2018  Langton .............. H04L 63/1441
(Continued)

OTHER PUBLICATIONS

BOSE "Outlier Detection: An Introduction To its Techniques", 2019 (Year: 2019).

(Continued)

*Primary Examiner* — Moeen Khan
(74) *Attorney, Agent, or Firm* — Ashwin Anand

(57) ABSTRACT

Disclosed herein are methods, systems, and processes for detecting data exfiltration. A data exfiltration event in a network is detected. Traffic data regarding outgoing traffic of a source in the network associated with the data exfiltration event is received. A logarithmic transformation is applied to the traffic data to generate transformed data. An outlier identification technique is selected based on the transformed data and is executed on the transformed data to determine that the outgoing traffic is indicative of the data exfiltration event. An alert is generated in response to the determination that the outgoing traffic is indicative of the data exfiltration event.

19 Claims, 4 Drawing Sheets

(56) References Cited

U.S. PATENT DOCUMENTS

| | | | |
|---|---|---|---|
| 10,778,707 | B1 | 9/2020 | Rastogi |
| 2004/0195500 | A1 | 10/2004 | Sachs et al. |
| 2013/0304909 | A1* | 11/2013 | Pappu .................. H04L 47/823 709/224 |
| 2015/0082431 | A1 | 3/2015 | Davis et al. |
| 2016/0026915 | A1 | 1/2016 | Delp |
| 2016/0226905 | A1 | 8/2016 | Baikalov et al. |
| 2016/0241574 | A1 | 8/2016 | Kumar et al. |
| 2017/0237756 | A1* | 8/2017 | Lietz .................. H04L 63/1433 726/23 |
| 2018/0083992 | A1 | 3/2018 | Bose et al. |
| 2018/0091427 | A1* | 3/2018 | Kumar ................ H04L 43/0894 |
| 2018/0183827 | A1* | 6/2018 | Zorlular ............. H04L 63/1416 |
| 2018/0191755 | A1 | 7/2018 | Monaco et al. |
| 2018/0198812 | A1* | 7/2018 | Christodorescu ... H04L 63/1425 |
| 2018/0219879 | A1 | 8/2018 | Pierce |
| 2018/0253657 | A1* | 9/2018 | Zhao ...................... G06N 20/00 |
| 2018/0307784 | A1 | 10/2018 | Stevens et al. |
| 2018/0316707 | A1 | 11/2018 | Dodson et al. |
| 2019/0064223 | A1 | 2/2019 | Kincaid |
| 2020/0174867 | A1 | 6/2020 | Mo et al. |

OTHER PUBLICATIONS

Leydesdorff et al., "Classification and Powerlaws: The Logarithmic Transformation", 2006 (Year: 2006).
Kim et al., "Application of density-based outlier detection to database activity monitoring", 2013.
Merriam-Webster, "exfiltrate", 2021 (Year: 2021).
Santoyo "A Brief Overview of Outlier Detection Technique", 2017 (Year: 2017).
Shinneeb et al., "Variable threshold outlier identification in PIV data", 2004 (Year: 2004).
Ullah et al., "Data exfiltration: A review of external attack vectors and countermeasures", 2017 (Year: 2017).
Wang, "Outlier identification and market segmentation using kernel-based clustering techniques".
Whitley et al., "Statistics review 1: Presenting and summarising data", 2002 (Year: 2002).
Wikipedia, "Exfiltration", 2021 (Year: 2021).
Wikipedia, "Interquartile range", 2021 (Year: 2021).
Wu et al., "An Active Impulsive Noise Control Algorithm With Logarithmic Transformation", 2011 (Year: 2011).

* cited by examiner

SYSTEM AND METHOD FOR MONITORING NETWORK ACTIVITY FOR DETECTING DATA EXFILTRATION EVENTS

CROSS-REFERENCE TO RELATED APPLICATIONS

The present application claims the benefit of priority and is a Continuation of pending U.S. patent application Ser. No. 16/287,415 titled "Data Exfiltration Detector" and filed on Feb. 27, 2019," the entire disclosure of which is incorporated by reference herein.

TECHNICAL FIELD

Embodiments described herein generally relate to systems and methods for monitoring network activity and, more particularly but not exclusively, to systems and methods for detecting data exfiltration events.

BACKGROUND

Due to their prevalence in today's society, the internet and other types of networks have become a hub for criminal activity. Often times cyber-criminals or other threat actors attempt to install or otherwise deploy harmful applications on unprotected systems. Once a threat actor obtains access to a targeted system or device, they may perform further actions such as stealing data, escalating their privileges, or the like.

Certain network activity may be indicative that a threat actor is, for example, transferring data to or from network devices. For example, a high amount of network traffic may indicate that a threat actor has gained access to a device and is exfiltrating data therefrom.

Existing techniques for detecting this exfiltration activity often result in false positives. False positives not only annoy security personnel, but also distract them and divert computing resources from addressing actual malicious network activity.

A need exists, therefore, for systems and methods for detecting data exfiltration events that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for detecting a data exfiltration event on a network. The method includes receiving traffic data regarding outgoing traffic from a source associated with the traffic data, applying a normalizing transformation to the received traffic data resulting in transformed data, selecting at least one outlier identification technique based on a property of the transformed data, executing the at least one selected outlier identification technique on the transformed data to determine whether the traffic data regarding the outgoing traffic is indicative of a data exfiltration event, and performing at least one remedial action upon determining the traffic data regarding the outgoing traffic is indicative of a data exfiltration event.

In some embodiments, receiving the traffic data includes selecting a subset of network activity data, and the subset is selected based on at least one of time, timeframe, and source associated with the network activity data.

In some embodiments, applying a normalizing transformation includes performing a logarithmic transformation on the received traffic data.

In some embodiments, the property of the transformed data includes at least one of standard deviation and interquartile range.

In some embodiments, the determination of whether the traffic data regarding the outgoing traffic is indicative of an exfiltration event is based on a comparison against a baseline including at least one of time, duration, and source address, wherein the comparison is generated by the selected outlier identification technique.

In some embodiments, the method further includes applying at least one of a minimum size contextual filter to the results of the outlier identification technique so that only outgoing traffic data that exceeds a minimum size threshold is determined to be indicative of an exfiltration event and a magnitude contextual filter so that only outgoing traffic data that exceeds a threshold with respect to incoming traffic data is determined to be indicative of an exfiltration event.

In some embodiments the method further includes applying a classifier to the results of the selected outlier identification technique to identify items of data indicative of a data exfiltration event on the network. In some embodiments, the classifier is manually trained using feedback with respect to outgoing traffic indicative of an exfiltration event, and the method further includes implementing the feedback in future executions of the at least one outlier identification technique.

In some embodiments, the transformed data includes a plurality of uniform values, and the method further includes multiplying the uniform value by a constant to obtain a scaled value, wherein the determination that the outgoing traffic is indicative of a data exfiltration event is based on the received traffic data exceeding the scaled value.

According to another aspect, embodiments relate to a system for detecting a data exfiltration event. The system includes an interface for receiving traffic data regarding outgoing traffic from a source associated with the traffic data and a processor executing instructions stored on a memory to apply a normalizing transformation to the received traffic data resulting in transformed data, select at least one outlier identification technique based on a property of the transformed data, execute the at least one selected outlier identification technique on the transformed data to determine whether the traffic data regarding the outgoing traffic is indicative of an exfiltration event, and perform at least one remedial action upon determining the traffic data regarding the outgoing traffic is indicative of an exfiltration event.

In some embodiments, the processor is further configured to select a subset of network activity data as the traffic data regarding the outgoing traffic, and the processor selects the subset based on at least one of time, timeframe, and source associated with the network activity data.

In some embodiments, the processor applies the transformation by performing a logarithmic transformation on the received traffic data.

In some embodiments, the property of the transformed data includes at least one of standard deviation and interquartile range.

In some embodiments, the determination of whether the traffic data regarding the outgoing traffic is indicative of a data exfiltration event is based on a comparison against a baseline including at least one of time, duration, and source address, wherein the comparison is generated by the selected outlier identification technique.

In some embodiments, the processor is further configured to apply at least one of a minimum size contextual filter to the results of the outlier identification technique so that only outgoing traffic data that exceeds a minimum size threshold is determined to be indicative of an exfiltration event and a magnitude contextual filter so that only outgoing traffic data that exceeds a threshold with respect to incoming traffic data is determined to be indicative of an exfiltration event.

In some embodiments, the processor is further configured to apply a classifier to the results of the selected outlier identification technique to identify items of data indicative of a data exfiltration event on the network. In some embodiments, the classifier is manually trained using feedback with respect to outgoing traffic indicative of an exfiltration event, and the processor is further configured to implement the feedback in future executions of the at least one outlier identification technique.

In some embodiments, the transformed data includes a plurality of uniform values, and the processor is further configured to multiply the uniform value by a constant to obtain a scaled value, wherein the determination that the outgoing traffic is indicative of a data exfiltration event is based on the received traffic data exceeding the scaled value.

According to yet another aspect, embodiments relate to a method for detecting a data exfiltration event on a network. The method includes receiving traffic data regarding outgoing traffic from a source associated with the traffic data, performing a logarithmic transformation on the received traffic data resulting in transformed data, calculating the interquartile range and the standard deviation of the transformed data, selecting at least one outlier identification technique based on the calculated interquartile range and the standard deviation of the transformed data, executing the at least one selected outlier identification technique on the transformed data to determine whether the traffic data regarding the outgoing traffic is indicative of an exfiltration event, and performing at least one remedial action upon determining the traffic data regarding the outgoing traffic is indicative of an exfiltration event.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
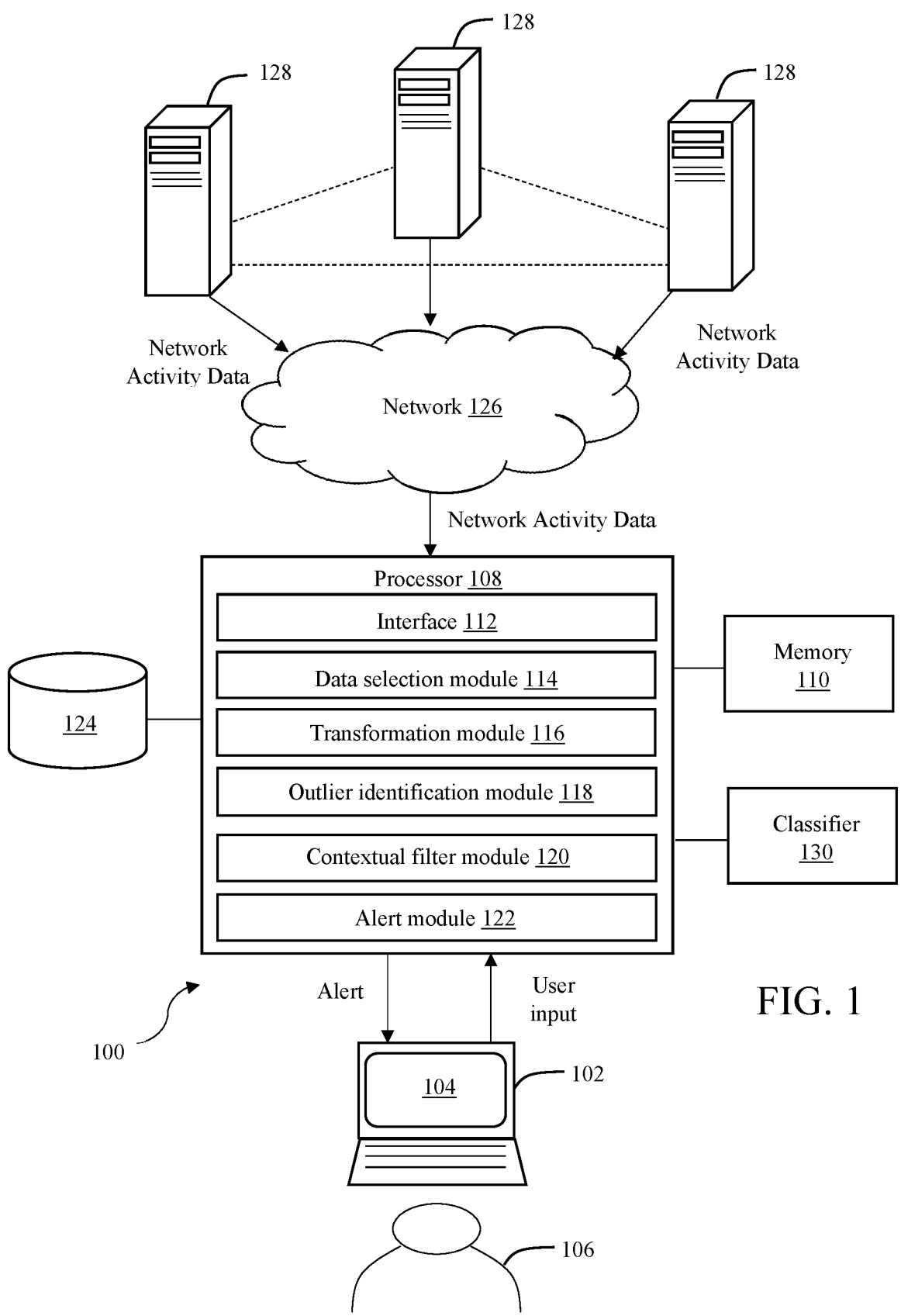
FIG. 1 illustrates a system for detecting a data exfiltration event in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein provide novel techniques for monitoring network activity to detect data exfiltration events. The embodiments described herein differentiate between benign instances in which data is sent from a network or a device for a legitimate reason, and instances in which traffic data is indicative of a data exfiltration event that should be addressed or at least further examined.

Distinguishing between benign instances and actual exfiltration events reduces false positives. By alerting security personnel of only legitimate exfiltration events, security personnel can focus their time and resources on addressing actual network threats.

This problem is difficult to automate as there are many legitimate reasons for large amounts of data to leave a network and/or a device. Additionally, network activity and traffic patterns may vary between organizations and departments within organizations. For example, outgoing traffic data may be considered normal for one device on a network but may be unusual for another device or network.

The systems and methods described herein address these challenges by learning different network traffic patterns and filtering false positives to obtain high fidelity information. The systems and methods described herein receive data regarding network traffic and user behavior to identify when atypical amounts of data leave a device or network. Using filtering, anomaly detection, and classification techniques, the systems and methods described herein provide a high quality list of exfiltration events. These events can be inspected manually and/or ingested into another security tool for further analysis.

FIG. 1 illustrates a system 100 for detecting a data exfiltration event on a network in accordance with one embodiment. The system 100 may include a user device 102 executing a user interface 104 for presentation to a user 106. The user interface 104 may allow a user 106 such as security personnel to view data regarding activity on a network such as data regarding exfiltration events.

The user interface 104 may also issue alerts to inform the user 106 of data exfiltration events. The user 106 may then review any data associated with the alert (e.g., the data that caused the alert to be issued) and perform any appropriate remedial and/or mitigation action(s).

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106.

The user device 102 may be in operable communication with one or more processors 108. The processor(s) 108 may be any hardware device capable of executing instructions stored on memory 110 to accomplish the objectives of the various embodiments described herein. The processor 108 may be a microprocessor, a field programmable gate array (FPGA), an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located at some remote location.

The processor 108 may execute instructions stored on memory 110 to provide various modules to accomplish the objectives of the various embodiments described herein. Specifically, the processor 108 may execute or otherwise include an interface 112, a data selection module 114, a transformation module 116, an outlier identification module 118, a contextual filter module 120, and an alert module 122.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for detecting a data exfiltration event can be executed by the processor 108 to accomplish the objectives of various embodiments described herein One or more databases 124 may store baseline data such as data regarding the expected or otherwise normal behavior of devices on one or more networks 126. This data may be leveraged to help determine whether outgoing traffic is atypical or is otherwise anomalous.

For example, the database(s) 124 may store data regarding source and destination addresses of all connections originating on the network(s) 126, as well as their size, duration, and time stamp of such connections. At the other end, each candidate for a possible exfiltration event may include a source IP and how much data it sent out, as well as data about the destinations to aid users in evaluating the event.

The processor 108 may execute instructions stored on memory 110 and receive network activity from one or more sources 128 over one or more networks 126. The processor 108 may execute instructions stored on memory 110 and rely on data stored in the database(s) 124 to monitor the received network activity data. The network(s) 126 may link the various devices with various types of network connections. The network(s) 126 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS)

connection, a Digital Subscriber Line (DSL) connection, an Ethernet connection, an Integrated Services Digital Network (ISDN) line, a dial-up port such as a V.90, a V.34, or a V.34b is analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 126 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

In operation, the interface 112 may receive network activity data that includes outgoing traffic from one or more sources 128 associated with the network activity data. In the context of the present application, the term "source" refers to a device that sends out data (and may therefore be at risk of being a victim of an exfiltration event).

A user 106 may configure the system 100 such that the network activity data is received at periodic intervals or continuously. For example, the user 106 may configure source(s) 128 to transmit data regarding their associated outgoing traffic periodically (e.g., once an hour) or whenever they send out a certain amount of data within a certain time frame.

The interface 112 may receive this data, at which point the data selection module 114 may select a subset of the received traffic data for analysis. For example, the data selection module 114 may select outgoing data from only a single source (e.g., as designated by a particular IP address). Tracking devices based on their IP address is only an exemplary technique for tracking, and any other technique(s) whether available now or invented hereafter may be used in accordance with the embodiments described herein.

Additionally or alternatively, the data selection module 114 may select data regarding traffic that occurs over a certain time window, such as between 1:00 PM and 2:00 PM on certain day(s) of the week. As yet another example, the data selection module 114 may only select traffic data that indicates a threshold amount of data traffic (e.g., as determined by a minimum byte count) has been sent.

The processor 108 may compare the received, selected data with one or more historical data sets. Based on these comparisons, the processor 108 may flag connections through which the amount of data transferred is large or otherwise atypical based on the stored data. As alluded to above, there may be multiple ways to define "atypical" depending on the type of baseline considered.

For example, the processor 108 may use a baseline for a certain time window to determine whether a data transfer is large compared to historical behavior at that time. The selected time window may be an hour, and an alert such as "the detected amount of data sent is large for 2:00 PM-3:00 PM" may be presented to a user 106. As another example, an alert such as "the detected amount of data sent is large for 2:00 PM on a Friday" may be presented to the user 106.

As another example, the user 106 may select baselines for individual source IPs. In these scenarios, an alert may be presented to the user 106 such as "the detected amount of data this source sent is large compared to this source's historical behavior." Similarly, a user 106 may select to use baselines for a class C subnet, a class B subnet, or the entire network so that the user interface 104 may present an alert such as "the detected amount of data sent is large compared to anything on the network."

As yet another example, the user 106 may select baselines for time frames. While going further back in time has the advantage of obtaining more data for a more statistically robust baseline, older data has a higher risk of not reflecting current IP assignments or work patterns.

As discussed above, applying existing anomaly detection techniques to network data often results in noisy alerts with many false positives. This is particularly true if the data has no clear pattern or distribution. Accordingly, the transformation module 116 may apply a normalizing transformation to the data received from the data selection module 114 to make the received data at least closer to a normal distribution.

For example, in some embodiments, the transformation module 116 may apply a logarithmic transformation on the received traffic data to reduce any skew associated with the data. In addition to or in lieu of a logarithmic transformation, the transformation module 116 may apply any suitable transformation to bring the received data as close to a normal distribution as possible.

Figure 2:
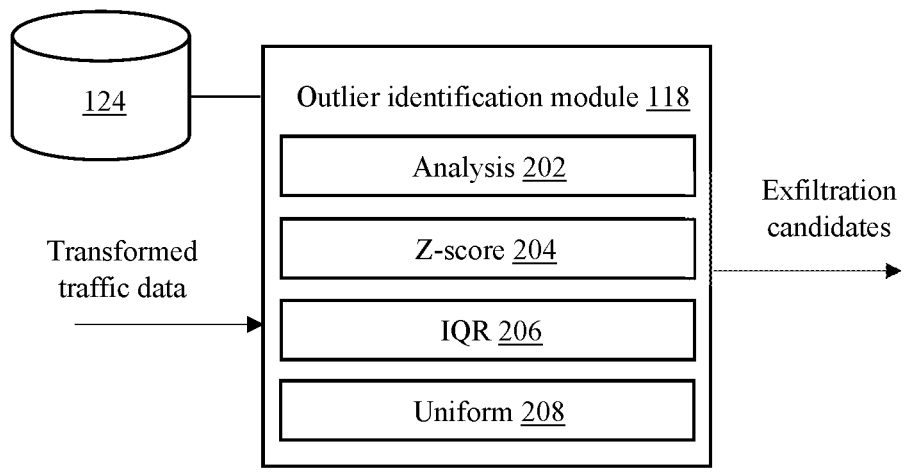
FIG. 2 illustrates the outlier identification module of FIG. 1 in accordance with one embodiment.

The transformed data may then be communicated to the outlier identification module 118. FIG. 2 illustrates the outlier identification module 118 of FIG. 1 in accordance with one embodiment. As seen in FIG. 2, the outlier identification module 118 may include various sub-modules to analyze the received data to generate exfiltration candidates. Specifically, the outlier identification module 118 may include an analysis module 202, a Z-score module 204, an inter-quartile range (IQR) module 206, and a uniform data module 208.

Depending on one or more properties of the traffic data, one of the sub-modules 204, 206, 208 may be better suited to analyze the traffic data than the other two. The analysis module 202 may therefore analyze one or more properties of the received, transformed traffic data to determine which of the Z-score module 204, IQR module 206, and the uniform module 208 are to analyze the received, transformed traffic data.

The Z-score module 204 may calculate a Z-score regarding one or more features associated with the network activity data. The Z-score compares a subset of activity data against an established baseline (based on previous network activity) to identify outliers.

An advantage of using the Z-score to identify exfiltration candidates is that the tolerances can flex based on the established baseline. In other words, if the baseline behavior is highly uniform, then the tolerance level used to identify outliers will be tighter. On the other hand, if the baseline behavior for a particular feature encompasses a wider range or variety of values, the tolerances will be wider (i.e., a network event would need to be more "extreme" to be classified as an exfiltration candidate).

The Z-score module 204 may calculate the Z-score for a particular feature by subtracting the baseline mean (i.e., simple average) from an individual connection or activity of interest, and then divide that value by the standard deviation of the baseline. Or, in some embodiments, the Z-score module 204 may subtract the baseline mean from an average over a time series interval and then divide by the standard deviation of the baseline.

In other words, the Z-score is the number of standard deviations away from the mean of a received network activity data value. For example, a mean byte count associated with a source device's transmissions may be 1,000, and the standard deviation may be 50. If this source is involved in a connection that has a byte count of 2,500, then the Z-score can be calculated as (2,500 1,000)/50=30. If the minimum or otherwise Z-score threshold value for which the Z-score module 204 classifies activity as anomalous is 5 (and 30>5), then the Z-score module 204 may conclude this activity is anomalous and therefore an exfiltration candidate.

Accordingly, calculating the Z-score of the received traffic data is appropriate when the traffic data has numerous values that are narrowly clustered near a range of values (i.e., a standard distribution). On the other hand, calculating the Z-score of the received traffic data would not work or produce useful results if the traffic data is uniform and has a standard deviation of zero.

The IQR module 206 may calculate the inter-quartile range of the received traffic data. The IQR is the statistical dispersion of results between the 25th percentile ($Q_1$) and the 75th percentile ($Q_3$). In other words, the IQR is the statistical dispersion in the middle 50% of the received traffic data. The IQR is the difference between $Q_3$ and $Q_1$ (i.e., $IQR=Q_3-Q_1$).

The IQR module 206 may use the IQR to find statistical outliers by subtracting the baseline median from an individual result of the traffic data, and then dividing by the calculated IQR. The IQR module 206 may output an exfiltration candidate if the number of IQRs away from the median is higher than a defined threshold.

The IQR-based approach therefore works well to identify anomalies in situations in which there are large outliers. In these types of cases, other anomaly detection techniques would obtain inaccurate results as these extreme outliers may skew the data themselves. Accordingly, this IQR-based method does not consider these extreme outliers.

There may be scenarios, however, in which neither the Z-score nor the IQR approach would return meaningful results. For example, there may be situations in which an edge case exists in that the entirety of the baseline data comprises the exact same, uniform value. In these cases, the standard deviation and the IQR will both be zero. Accordingly, neither of the above approaches will work since there would be a "divide-by-zero" scenario which would not return any useful results.

The uniform module 208 may therefore execute a third approach hereinafter referred to as the uniform outlier identification technique. In this technique, the uniform module 208 may recognize as exfiltration candidates data points that are larger than the product of the uniform value and some constant. In other words, the uniform module 208 scales the uniform value by some amount and, if a new data point is greater than the scaled amount, the uniform module 208 may consider the data point an exfiltration candidate.

For example, if all values in the baseline are "500" (e.g., a source device always sends out 500 bytes of data at 10:00 AM on Mondays), the standard deviation and the IQR for this dataset would be zero. Accordingly, neither the Z-score module 204 nor the IQR module 206 would return a useful result.

In this case, the uniform module 208 would be the most appropriate module to analyze this data. A user 106 may specify a constant (e.g., 1.2), such that any received value that is greater than 600 (500*1.2) is considered to be an exfiltration candidate. This approach therefore allows for minor variability in a current data point relative to the uniform baseline. However, this approach still recognizes a data point as an exfiltration candidate if the data point deviates from the uniform value by a certain amount.

In summary, the Z-score approach is the most appropriate outlier identification technique when the IQR is zero and the standard deviation is not zero. The IQR-based approach is the most appropriate when the IQR is greater than zero and the standard deviation does not equal zero. The uniform outlier identification technique is the most appropriate when the IQR equals zero and the standard deviation equals zero. The outlier identification module 118 in various embodiments may analyze these and other statistical properties of the received data and subsequently select the most appropriate technique(s) from these and various other techniques known to those of ordinary skill for further analysis based on the analyzed statistical properties.

The output of the outlier identification module 118 may include one or more exfiltration candidates. Depending on the size and properties of the received traffic data set, the outlier identification module 118 may output multiple exfiltration candidates, wherein one more of the candidates were detected by different sub-modules 204, 206, and 208.

The exfiltration candidates outputted by the outlier identification module 118 in FIG. 2 may still represent a noisy set of candidates. Accordingly, the contextual filter module 120 may execute one or more contextual filters to filter candidates that can legitimately be explained. The output of the contextual filter module 120 is therefore a concise, accurate list of one or more data exfiltration events that should be addressed or at least further examined.

Figure 3:
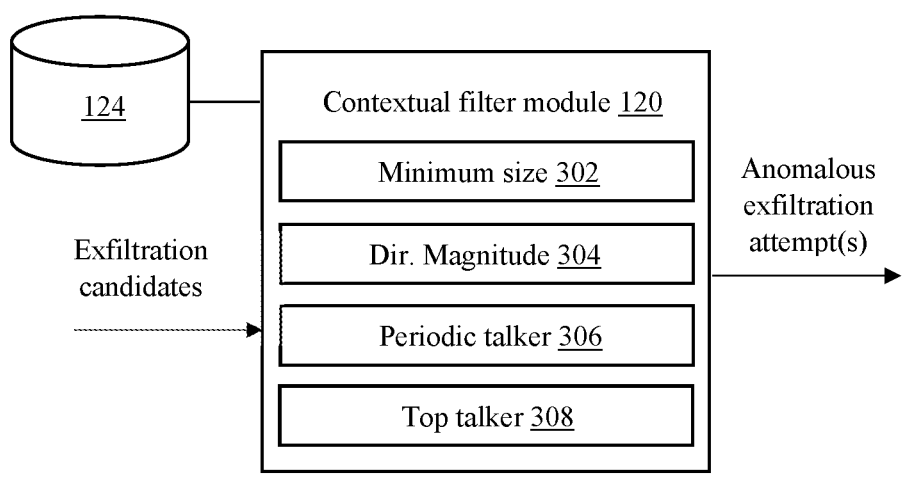
FIG. 3 illustrates the contextual filter module of FIG. 1 in accordance with one embodiment.

FIG. 3 illustrates the contextual filter module 120 of FIG. 1 in accordance with one embodiment. As seen in FIG. 3, the contextual filter module 120 may receive the exfiltration candidates outputted by the outlier identification module 118 in FIG. 2.

The contextual filter module 120 may execute one or more filters such as a minimum size filter 302, a directionality magnitude filter 304, a periodic talker filter 306, and a top talker filter 308. The minimum size filter 302 may only recognize an exfiltration candidate as a data exfiltration event if the amount of data associated with the candidate is above some size threshold. For example, even though a source IP address may send out an amount of data that is large for that particular source, no alert will be generated if that amount of data does not exceed a minimum size threshold.

The directionality magnitude filter 304 may only recognize an exfiltration candidate as a data exfiltration event if the candidate sent more data out than it received. This prevents the generation of alerts if a source sends out and receives the same amount of data. In other words, the directionality magnitude filter 304 filters for candidates that sent more data (e.g., in a particular time frame) than they received.

A user 106 may also customize the directionality magnitude filter 304 so that exfiltration candidates are recognized as data exfiltration events only if the amount of sent data is greater than the amount of received data by some amount. For example, an exfiltration candidate may be recognized as a data exfiltration event only if the amount of sent data is at least twice the amount of received data.

The periodic talker filter 306 may identify periodic talkers (e.g., sources that regularly send out large amounts of data). Data regarding these periodic talkers such as when they normally send out these large amounts of data may be stored in the database(s) 124. Accordingly, the periodic talker filter 306 may filter out these periodic talkers such that the processor 108 does not recognize an exfiltration candidate as a data exfiltration event if the periodic talker(s) send out data in accord with their stored transmission histories (assuming other conditions are satisfied as well).

Similarly, the top talker filter 308 may prevent the events of top talkers in a network from being recognized as data exfiltration events. For example, certain users on a network may be responsible for a significant portion of the network's activity.

The top talker filter 308 is therefore intended for cases in which the baseline is calculated over the entire network or a subnet thereof. The top talker filter 308 addresses the scenario(s) in which there are a few sources on the network or a subnet that consistently send out more data compared to other sources. These sources would therefore be responsible for generating the majority of alerts, even if the amount of data is in line with their own individual historical behavior. Accordingly, the top talker filter 308 identifies these sources on the network and filters would-be alerts for these sources (assuming other conditions are satisfied as well).

This list of filters is merely exemplary and it is contemplated that other filters in addition to or in lieu of those shown in FIG. 3 may be implemented to accomplish the objectives of the systems and methods described herein.

Referring back to FIG. 1, the alert module 122 may issue one or more alerts to user(s) 106 upon the contextual filter module 120 detecting one or more data exfiltration events. The alert may be a visual-based alert, a text-based alert, an audio-based alert, a haptic-based alert, or some combination thereof. A user 106 such as security personnel may then be inclined to inspect the cause of the alert and perform any remedial actions (e.g., locking the source out of the network or halting all communications from the source). Additionally or alternatively, the processor 108 may autonomously perform any suitable remediation or mitigation techniques.

FIG. 1 also illustrates a classifier 130. After the processor 108 issues an alert to one or more user(s) 106, the user(s) 106 may subsequently provide feedback regarding the usefulness of the alert (e.g., whether the identified data was actually indicative of a data exfiltration event). For example, a user 106 may tag a subset of alerts as either "useful" or "not useful."

The classifier 130 may then use these tags to build a classification model on potential exfiltration events to predict whether alerts therefor would be useful if issued. Accordingly, the processor 108 may leverage this model in future executions of the outlier identification module 118 and contextual filter module 120 to continuously reduce the number of false positives.

Figure 4:
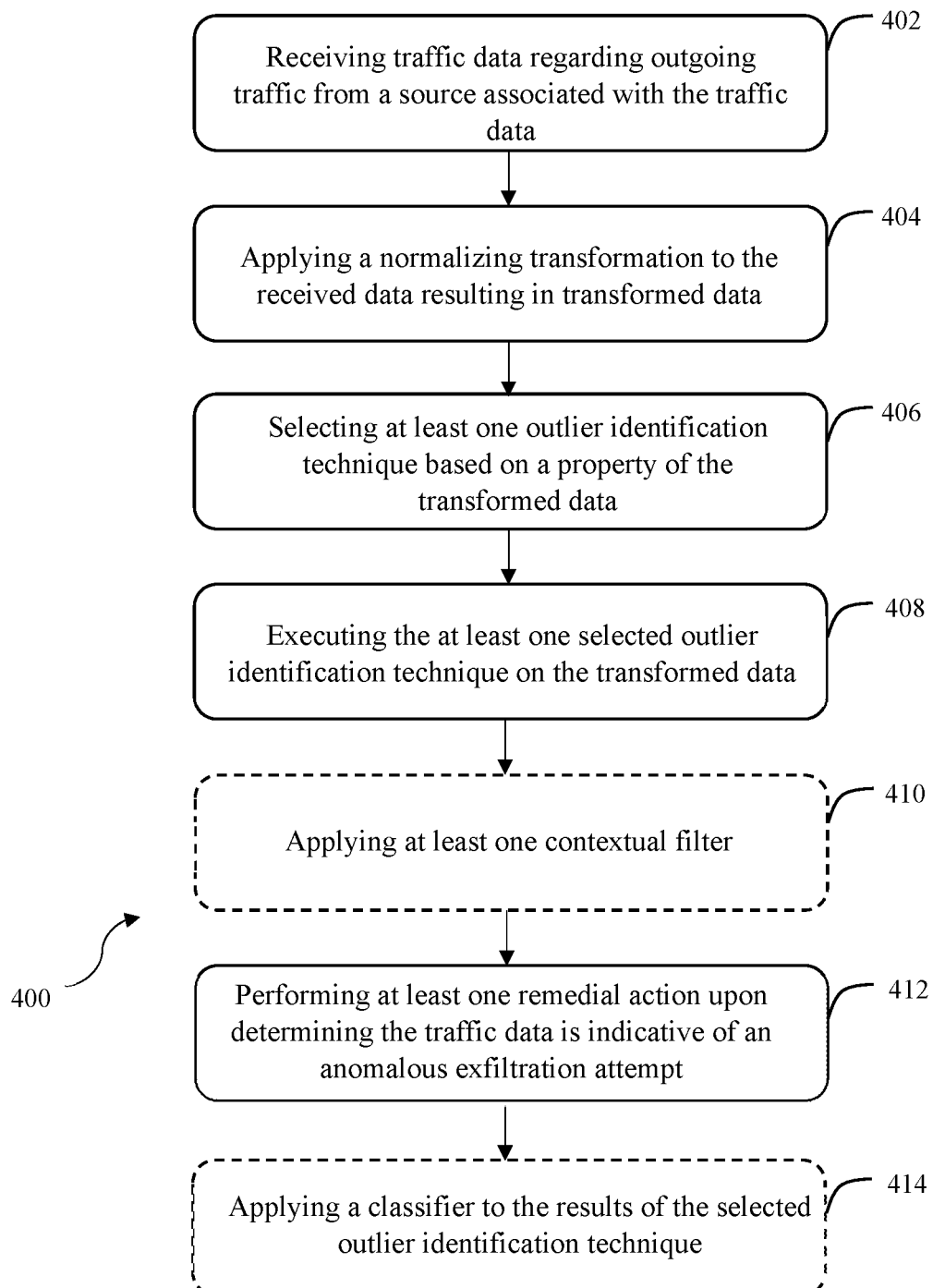
FIG. 4 depicts a flowchart of a method for detecting a data exfiltration event in accordance with one embodiment.

FIG. 4 depicts a flowchart of a method 400 for detecting a data exfiltration event on a network in accordance with one embodiment. Step 402 involves receiving traffic data regarding outgoing traffic from a source associated with the traffic data. This data may be received at an interface and may be collected at periodic intervals or whenever a source sends out a certain amount of data.

Step 404 involves applying a normalizing transformation to the received traffic data resulting in transformed data. Oftentimes received traffic data may be skewed or otherwise not amenable for analysis to detect outliers. Accordingly, the method 400 may applying a normalizing transformation to bring the data at least closer to a normal distribution. In some embodiments, the transformation may be a logarithmic transformation.

Step 406 involves selecting at least one outlier identification technique based on a property of the transformed data. As discussed above, different techniques may be better suited to analyze the transformed traffic data based on one or more properties of the data. For example, based on the standard deviation and the IQR of the traffic data, one of the previously-discussed outlier identification techniques may be better suited to analyze the transformed data than the other techniques.

For example, and as discussed previously:
The uniform method is best used when ((IQR==0) AND (stddev==0));
The Z-score method is best used when ((IQR==0) AND (stddev !=0)); and
The IQR method is best used when ((IQR>0) AND (stddev !=0)).

Accordingly, based on one or more properties of the transformed data, the outlier identification module 118 of FIGS. 1 and 2 may select one or more of these outlier identification techniques to analyze the received data.

Step 408 involves executing the at least one selected outlier identification technique on the transformed data to determine whether the traffic data regarding the outgoing traffic is indicative of an exfiltration event. Applicant notes that these methods or techniques are only exemplary and any other anomaly detection techniques whether available now or invented hereafter may be used to determine whether traffic data regarding outgoing traffic is indicative of an exfiltration event.

Step 410 involves applying at least one contextual filter. For example, step 410 may involve applying a minimum size contextual filter to the results of the outlier identification technique so that only outgoing traffic data that exceeds a minimum size threshold is determined to be indicative of an exfiltration event. Additionally or alternatively, step 410 may involve applying a magnitude contextual filter so that only outgoing traffic data that exceeds a threshold with respect to incoming traffic data is determined to be indicative of an exfiltration event. Accordingly, the application of these filters at the very least minimizes false positives by filtering out legitimate or otherwise benign instances in which data is sent.

Step 412 involves performing at least one remedial action upon determining the traffic data regarding the outgoing traffic is indicative of an exfiltration event. For example, an alert may be issued to a user such as security personnel informing them of the identified exfiltration event. The user may then investigate the exfiltration event and perform any appropriate remedial or mitigation actions. Additionally or alternatively, the processor 108 of FIG. 1 may autonomously perform any appropriate remedial or mitigation actions.

For example, the processor 108 may halt any communications to or from the device associated with the exfiltration event. Similarly, in some embodiments, the processor 108 may update the credentials required to access or perform any actions with respect to the device.

In some embodiments, the processor 108 may add the device associated with the exfiltration event to a gray- or blacklist to indicate the device has been the subject of malicious action and should be more closely monitored in the future. As another example, the processor 108 may limit how much data a device associated with the exfiltration attempt may transfer in the future (e.g., in a given time frame).

The normal user of the device may have unknowingly performed some action with respect to their device that enabled a threat actor to gain access and perform the exfiltration event. For example, the user may have been the victim of a phishing attempt. Accordingly, the processor 108 may provide educational information to the user about how to protect themselves from such attacks in the future.

Step 414 involves applying a classifier to the results of the selected outlier identification technique to identify items of data indicative of an exfiltration event. The classifier may be manually trained using feedback with respect to the usefulness of issued alerts as well. As discussed previously, the processor of FIG. 1 may then execute the classifier in conjunction with the outlier identification module 118 and the contextual filter module 120 to implement the feedback in future executions. The classifier model can therefore continuously improve the systems and methods described herein by reducing false positives.

Figure 5:
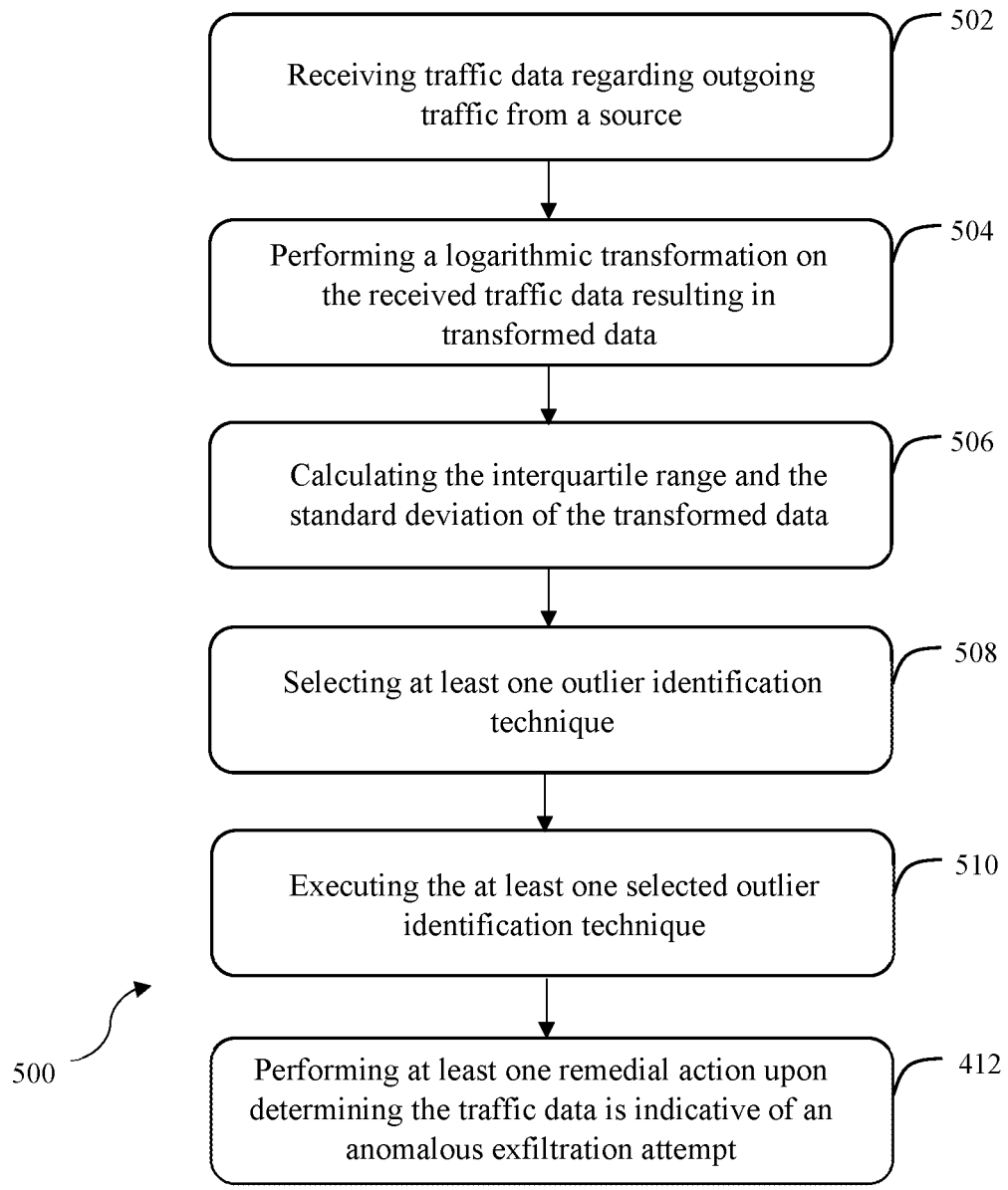
FIG. 5 depicts a flowchart of a method for detecting a data exfiltration event in accordance with another embodiment.

FIG. 5 depicts a flowchart of a method 500 for detecting a data exfiltration event on a network in accordance with another embodiment. Step 502 involves receiving traffic data regarding outgoing traffic from a source associated with the traffic data. This data may be received at an interface and may be collected at periodic intervals or whenever a source sends out a certain amount of data.

Step 504 involves performing a logarithmic transformation on the received traffic data resulting in transformed data. Often times data may be skewed, and performing this type of transformation helps bring the received traffic data at least closer to a normal distribution.

Step 506 involves calculating the interquartile range and the standard deviation of the transformed data. These properties of the transformed data help determine which outlier identification technique is most suitable to analyze said data.

Step 508 involves selecting at least one outlier identification technique based on the calculated interquartile range and the standard deviation of the transformed data. As discussed previously, certain outlier identification techniques are better suited than others to analyze the traffic data based on the data's properties, such as IQR and standard deviation. Accordingly, step 508 involves selecting the most appropriate identification technique.

Steps 510 and 512 are similar to steps 408 and 412, respectively, of FIG. 4 and the discussion thereof is not repeated here.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:
1. A method comprising:
   detecting a data exfiltration event in a network;
   receiving traffic data regarding outgoing traffic of a source in the network associated with the data exfiltration event;
   applying a logarithmic transformation to the traffic data to generate transformed data;
   selecting at least one outlier identification technique from among a plurality of outlier identification techniques including a uniform method, a Z-score method, and an inter-quantile range (IQR) method, wherein the selection is made based on a standard deviation or an inter-quartile range of the transformed data, and the uniform method is selected when the transformed data has a standard deviation of zero;
   executing the at least one selected outlier identification technique on the transformed data;
   applying one or more contextual filters to result of the at least one outlier identification technique, wherein the one or more contextual filters include one or more of:
   (a) a minimum size contextual filter that filters outgoing traffic data based on a minimum size threshold the outgoing traffic, and

(b) a magnitude contextual filter that filters outgoing traffic data based on an amount of incoming traffic data to a same source;

determining based on the application of the one or more contextual filters to the result of the at least one outlier identification technique that the outgoing traffic is indicative of the data exfiltration event; and generating an alert in response to the determination that the outgoing traffic is indicative of the data exfiltration event.

2. The method of claim 1, further comprising:
detecting a second data exfiltration event in the network;
receiving second traffic data regarding additional outgoing traffic of the source;
applying the logarithmic transformation to the second traffic data to generate second transformed data;
executing a second outlier identification technique on the second transformed data to determine that the additional outgoing traffic is not indicative of the second data exfiltration event; and
responsive to the determination that the additional outgoing traffic is not indicative of the second data exfiltration event, filtering out the second data exfiltration event as a false positive so that the second data filtration event does not cause a second alert to be generated.

3. The method of claim 1, wherein receiving the traffic data includes selecting a subset of network activity data based on at least one of time, timeframe, and source associated with the network activity data.

4. The method of claim 1, wherein:
the traffic data indicates one or more amounts of the outgoing traffic generated from the source in one or more time frames; and
the logarithmic transformation is applied to the one or more amounts of the outgoing traffic.

5. The method of claim 1, wherein:
applying the logarithmic transformation to the traffic data reduces a skew associated with the traffic data, so that the transformed data is more closely approximates a normal distribution than the traffic data.

6. The method of claim 1, wherein:
the alert is generated via a user interface of a computer, wherein the computer is configured to display network activity of the network via the user interface.

7. The method of claim 6, further comprising:
performing one or more remedial or mitigation actions on the network according to user input received via the user interface.

8. The method of claim 6, wherein the alert indicates that an amount of the outgoing traffic generated by the source in a particular time frame is excessively large.

9. The method of claim 6, wherein the alert indicates that an amount of outgoing traffic generated by the source is anomalous based on a historical behavior of the source.

10. The method of claim 6, wherein the alert indicates that an amount of outgoing traffic generated by the source is anomalous based on behavior of one or more other computers in the network.

11. A system comprising:
one or more computers that implement a data exfiltration detector, configured to:
detect a data exfiltration event in a network;
receive traffic data regarding outgoing traffic of a source in the network associated with the data exfiltration event;
apply a logarithmic transformation to the traffic data to generate transformed data;
select at least one outlier identification technique from among a plurality of outlier identification techniques including a uniform method, a Z-score method, and an inter-quantile range (IQR) method, wherein the selection is made based on a standard deviation or an inter-quartile range of the transformed data, and the uniform method is selected when the transformed data has a standard deviation of zero;
execute the at least one selected outlier identification technique on the transformed data;
apply one or more contextual filters to result of the at least one outlier identification technique, wherein the one or more contextual filters include one or more of:
(a) a minimum size contextual filter that filters outgoing traffic data based on a minimum size threshold the outgoing traffic, and
(b) a magnitude contextual filter that filters outgoing traffic data based on an amount of incoming traffic data to a same source;
determine based on the application of the one or more contextual filters to the result of the at least one outlier identification technique that the outgoing traffic is indicative of the data exfiltration event; and
generate an alert in response to the determination that the outgoing traffic is indicative of the data exfiltration event.

12. The system of claim 11, wherein the data exfiltration detector is configured to:
detect a second data exfiltration event in the network;
receive second traffic data regarding additional outgoing traffic of the source;
apply the logarithmic transformation to the second traffic data to generate second transformed data;
execute a second outlier identification technique on the second transformed data to determine that the additional outgoing traffic is not indicative of the second data exfiltration event; and
responsive to the determination that the additional outgoing traffic is not indicative of the second data exfiltration event, filter out the second data exfiltration event as a false positive so that the second data filtration event does not cause a second alert to be generated.

13. The system of claim 11, wherein the data exfiltration detector is configured to select the IQR method when the transformed data contain one or more network events that are classified as extreme outliers with respect to a baseline behavior.

14. The system of claim 11, wherein the data exfiltration detector is configured to determine that the outgoing traffic is indicative of the data exfiltration event based on a comparison of the transformed data against a baseline generated based on the at least one selected outlier identification technique.

15. The system of claim 11, wherein the data exfiltration detector is configured to apply a classifier model to result of the at least one outlier identification technique, wherein the classifier model identifies items of data indicative of data exfiltration events in the network.

16. The system of claim 15, wherein the classifier model trained using user feedback indicating outgoing traffic that is indicative of actual exfiltration events.

17. One or more non-transitory computer-readable media storing program instructions storing program instructions that when executed on or across one or more processors implements a data exfiltration detector and cause the data exfiltration detector to:

detect a data exfiltration event in a network;
receive traffic data regarding outgoing traffic of a source in the network associated with the data exfiltration event;
apply a logarithmic transformation to the traffic data to generate transformed data;
select at least one outlier identification technique from among a plurality of outlier identification techniques including a uniform method, a Z-score method, and an inter-quantile range (IQR) method, wherein the selection is made based on a standard deviation or an inter-quartile range of the transformed data, and the uniform method is selected when the transformed data has a standard deviation of zero;
execute the at least one selected outlier identification technique on the transformed data;
apply one or more contextual filters to result of the at least one outlier identification technique, wherein the one or more contextual filters include one or more of:
  (a) a minimum size contextual filter that filters outgoing traffic data based on a minimum size threshold the outgoing traffic, and
  (b) a magnitude contextual filter that filters outgoing traffic data based on an amount of incoming traffic data to a same source;
determine based on the application of the one or more contextual filters to the result of the at least one outlier identification technique that the outgoing traffic is indicative of the data exfiltration event; and
generate an alert in response to the determination that the outgoing traffic is indicative of the data exfiltration event.

18. The one or more non-transitory computer-readable media of claim 17, wherein the program instructions when executed on or across one or more processors cause the data exfiltration detector to:
  detect a second data exfiltration event in the network;
  receive second traffic data regarding additional outgoing traffic of the source;
  apply the logarithmic transformation to the second traffic data to generate second transformed data;
  execute a second outlier identification technique on the second transformed data to determine that the additional outgoing traffic is not indicative of the second data exfiltration event; and
  responsive to the determination that the additional outgoing traffic is not indicative of the second data exfiltration event, filter out the second data exfiltration event as a false positive so that the second data filtration event does not cause a second alert to be generated.

19. The one or more non-transitory computer-readable media of claim 17, wherein:
  the alert is generated via a user interface of a computer; and
  the program instructions when executed on or across one or more processors cause the data exfiltration detector to perform one or more remedial or mitigation actions on the network according to user input received via the user interface.

* * * * *